(12) United States Patent
Mizumoto et al.

(10) Patent No.: US 7,740,770 B2
(45) Date of Patent: Jun. 22, 2010

(54) RESIN MOLDED ARTICLE AND METHOD FOR PRODUCING THE SAME

(75) Inventors: Koichi Mizumoto, Tsukuba (JP); Hiroshi Harada, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/071,494

(22) Filed: Feb. 21, 2008

(65) Prior Publication Data

US 2008/0203358 A1 Aug. 28, 2008

(30) Foreign Application Priority Data

Feb. 26, 2007 (JP) ............... 2007-045155

(51) Int. Cl.
- *C09K 19/00* (2006.01)
- *C09K 19/06* (2006.01)
- *C09K 19/52* (2006.01)
- *C09K 5/09* (2006.01)

(52) U.S. Cl. ............... 252/299.01; 252/299.1; 428/1.1; 430/20; 264/500; 524/296

(58) Field of Classification Search ............ 252/299.01, 252/299.1; 428/299.1, 1.1; 264/500; 524/296; 430/20

See application file for complete search history.

(56) References Cited

U.S. PATENT DOCUMENTS

| | | | |
|---|---|---|---|
| 5,007,947 A | 4/1991 | Kenmoti et al. | |
| 2005/0007680 A1 | 1/2005 | Naganuma et al. | |
| 2006/0197862 A1 | 9/2006 | Lung | |
| 2009/0004453 A1* | 1/2009 | Murai et al. | 428/299.1 |

FOREIGN PATENT DOCUMENTS

JP 9-297256 11/1997

* cited by examiner

*Primary Examiner*—Geraldina Visconti
(74) *Attorney, Agent, or Firm*—Foley & Lardner LLP

(57) ABSTRACT

The present invention provides for a resin molded article comprising a liquid crystalline polymer and a fibrous filler, the article having a surface with difference of 0.4 μm or smaller in a surface roughness expressed by Ra value measured before and after repeating 30 times the operation of pasting and peeling a tape having an adhesive power of 4.0 N/mm. The resin molded article is excellent in mechanical strength when used in an electric/electronic component or in an optical apparatus.

11 Claims, 3 Drawing Sheets

RESIN MOLDED ARTICLE AND METHOD FOR PRODUCING THE SAME

BACKGROUND OF THE INVENTION

1. Field of the Invention

The present invention relates to a resin molded article which is useful as a substrate for an electric/electronic component or an optical component, and a method for producing the same.

2. Description of the Related Art

A polymer material has been utilized as a structural material and an electrical insulating material in various fields from the viewpoint of ease of workability in molding and light-weight. In the field where higher performance is required (for example, in the field using the substrate for an optical apparatus), a liquid crystalline polymer has been applied with its advantages in heat resistance, dimensional stability, molding processability, mechanical strength, insulating property and flame retardancy. Specifically, the liquid crystalline polymer has been applied in a mechanical component; a case for accommodating a device; and materials for preparing an optical path (the examples of which are a switch, a relay, an image sensor, other various sensors, a light emitting diode (LED) and various housings of an optical mechanism system (lens tube and lens barrel)).

For example, in Japanese Patent Application Laid-Open (JP-A) No. 2006-246461 (corresponding to US 2006/0197862A), a camera module that can be surface-mounted is disclosed, and a liquid crystalline polymer is exemplified as a heat resistant material (for a lens holder, an image sensor board and the like) that can endure the conditions of surface-mounting process.

Further, in JP-A No. 09-297256, a liquid crystalline polymer is also used as a material applied to a camera lens barrel that has a good molding property and that is superior in mechanical characteristics such as strength and in dimensional accuracy such as roundness of the molded product.

Into the liquid crystalline polymer, an additive and a filler (including a reinforced filler) may be added in order to improve the characteristics of the resulting article. However, when the article having the reinforced filler is made into an electric, electronic or optical component, the process yield of the assembly production of the components may decrease, and the resulting electric, electronic or optical apparatus may induce a false operation with the lapse of use time of the components.

SUMMARY OF THE INVENTION

Under these circumstances, the present inventors made investigation on a resin molded article in order to obtain a resin molded article having a liquid crystalline polymer and a reinforced filler that is excellent in mechanical strength and is preferably used in electric, electronic and optical components, and as a result, have accomplished the present invention.

Thus, the present invention provides a resin molded article comprising a liquid crystalline polymer and a fibrous filler, the article having a surface with difference of 0.4 µm or smaller in a surface roughness expressed by Ra value measured before and after repeating 30 times the operation of pasting and peeling a tape having an adhesive power of 4.0 N/mm. Also, the present invention provides a method for producing the resin molded article, the method comprising the following steps of:

mixing and pelletizing a liquid crystalline polymer and a fibrous filler to obtain a resin composition pellet comprising the liquid crystalline polymer and the fibrous filler;

melting the resin composition pellet at a temperature of from a temperature higher than the flow starting temperature of the resin composition by 30° C. to a temperature higher than the flow starting temperature by 80° C. to obtain a melted resin composition; and injecting the melted resin composition into a mold having a set temperature of 80° C. or higher and molding the composition to obtain a resin molded article.

Further, the present invention provides a component for a camera module, the component comprising the resin molded article mentioned above.

In accordance with the present invention, even when using a reinforced filler together with a liquid crystalline polymer, a resin molded article can be obtained, the article capable of being made into an electric, electronic or optical component which can be assembled with a high production yield and reducing the occurrence of the false operation of the resulting component with the lapse of use time of the component. Accordingly, the resin molded article can be suitably used as a switch, a relay, an image sensor, other various sensors, a light emitting diode (LED), and various housings of an optical mechanism system (lens tube and lens barrel); a case for accommodating a device; materials for preparing an optical path. The resin molded article is preferably used as a component for a camera module. Further, the resin molded article is also superior in high heat resistance, high rigidity, dimensional stability, etc., and therefore, is extremely useful industrially.

DETAILED DESCRIPTION OF THE PREFERRED EMBODIMENTS

A resin molded article of the present invention is a resin molded article comprising a liquid crystalline polymer and a fibrous filler, the article having a surface with difference of 0.4 µm or smaller in a surface roughness expressed by Ra value measured before and after repeating 30 times the operation of pasting and peeling a tape having an adhesive power of 4.0 N/mm.

If the resin molded article of the present invention is made into an electric, electronic or optical component, the amount of fine particles generated from the component itself during the assembly process of the component and during the lapse of use time of the component is sufficiently reduced compared to the conventional molded article having filler. The present inventors have found that the fine particles may cause the decrease in production yield of the assembly process of the component and may induce the false operation of the apparatus having the component with the lapse of use time of the component. At least in terms of reducing amount of fine particles generated, the molded article of the present invention is superior to the conventional molded article.

As mentioned above, the article has a surface with difference of 0.4 µm or smaller in a surface roughness expressed by Ra value measured before and after repeating 30 times the operation of pasting and peeling a tape having an adhesive power of 4.0 N/mm. The difference in a surface roughness expressed by Ra value measured before and after the repeating operation of pasting and peeling a tape can be obtained by conducting a so-called "surface tape-peeling test".

Here, the surface tape-peeling test is described further in detail. In the surface tape-peeling test, a tape having an adhesive power of 4.0 N/mm is pasted onto a surface of the article and then is peeled off form the surface of the article 30 times. By measuring surface roughness expressed Ra values of the surface of the article before and after the 30-time peeling-off procedures, the increasing degree of the surface roughness of the article before and after the procedures can be expresses as a difference in Ra values obtained before and after the procedures.

Figure 1:
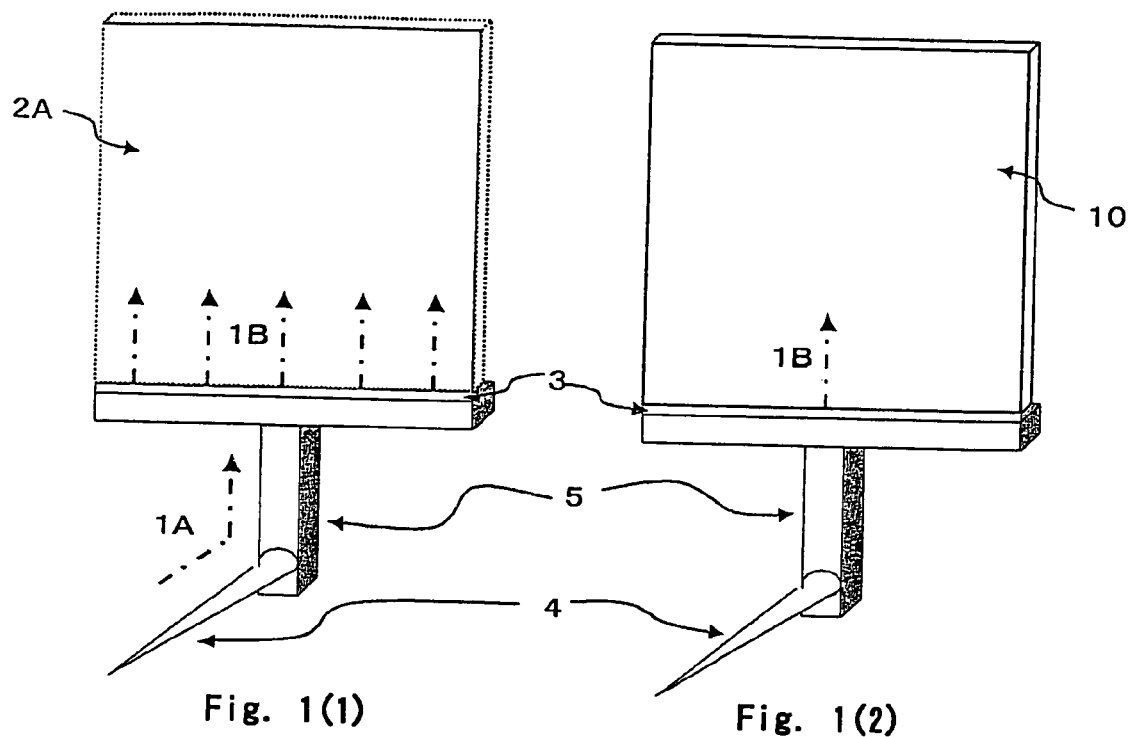
FIGS. 1(1) and 1(2) are views schematically showing a method for molding to prepare one example plate-shaped molded article.

Just for simplifying, using a molded article having a plate shape, one example of conducting the surface tape-peeling test will be demonstrated below:

FIG. 1(1) and (2) are schematic views showing a method for producing a plate-shaped molded article and the surface tape-peeling test using the plate-shaped molded article. In FIG. 1(1), a vacant part 2A is a vacant part for forming the molded article in a mold (not shown). A film gate 3 is arranged in the mold to send a molten resin in the vacant part 2A. The film gate 3 is equipped with a runner 5 having a vacant part and a sprue 4 so as to be connected each other, and the sprue 4 is connected to an injection unit containing the molten resin. When the molten resin is injected from the injection unit, the molten resin is supplied to the film gate 3 in a direction 1A through the sprue 4 and runner 5. From the film gate 3, the molten resin is supplied into the vacant part 2A in a direction 1B facing to the opposite side of the exit part of the molten resin of the film gate 3. After the vacant part 2A is filled with the molten resin, and a cooling process is performed if necessary, then the mold is taken apart to provide a plate-shaped molded article 10 together with the film gate 3, the runner 5, and the sprue 4, as is illustrated in FIG. 1(2). Next, the film gate 3, the runner 5 and the sprue 4 are removed by cutting away from the plate-shaped molded article 10 at the part between the article 10 and the film gate 3 to obtain the plate-shaped molded article 10.

The surface roughness Ra value, which is the arithmetical mean roughness Ra value defined in JISB06 01-1994, is measured at a main surface (preferably, at a planar part) of the plate-shaped molded article. The obtained value is regarded as an initial surface roughness Ra1 [µm]. Next, the tape-peeling test is carried out on the main surface at which the initial surface roughness Ra1 is obtained. A tape having an adhesive force of 4.0 N/mm is used. A Cellotape (trade mark) CT-18 manufactured by Nichiban Co., Ltd., was used as such a tape in the tape-peeling test conducted in Examples and Comparative Examples shown below.

Figure 2:
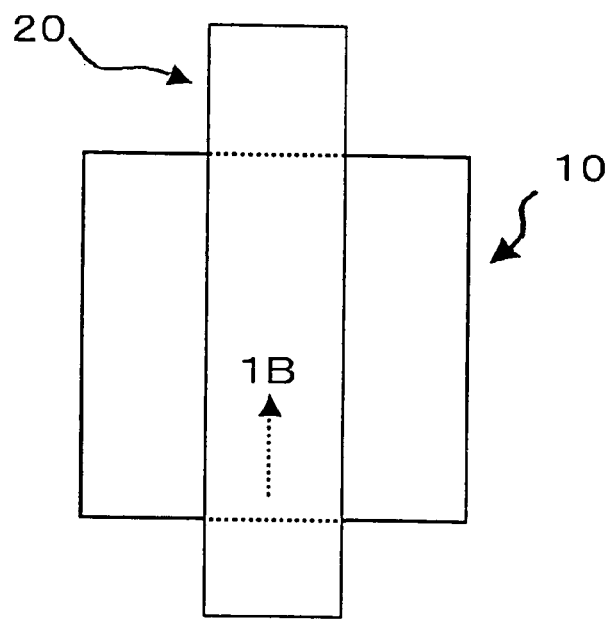
FIG. 2 is a view showing the state where a tape is pasted to a molded article in a tape-peeling test.
Figure 3:
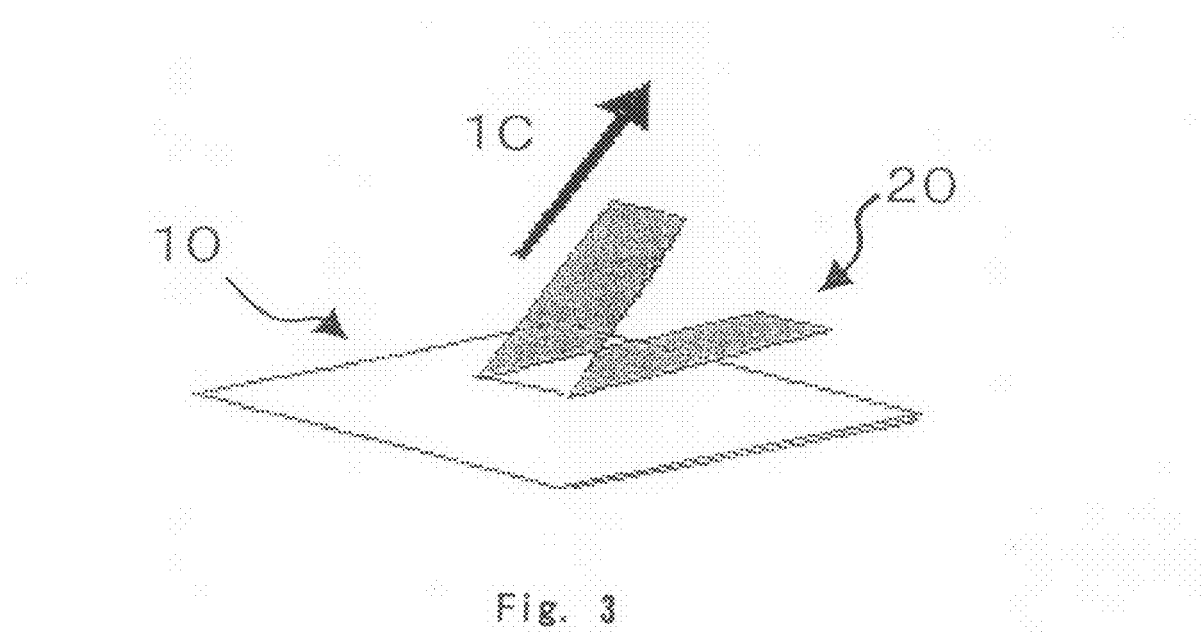
FIG. 3 is a schematic perspective view showing the molded article 10 and the tape 20 when the tape is peeled off from the molded article in a tape-peeling test.

FIG. 2 is a schematic view from the side of the tape, showing the state where the tape 20 is pasted to the molded article. A tape 20 is pasted on the main surface of the molded article 10 so that air bubbles are not generated between the tape 20 and the surface of the molded article 10. It is preferred that the tape 20 is pasted to the molded article along the flow direction 1B of the molded article 10. The tape 20 is then peeled off from the molded article 10. FIG. 3 is a schematic perspective view showing the molded article 10 and the tape 20 when the tape is peeled off. The tape 20 is peeled off quickly (over about 0.5 to 1 second) along a direction 1C at an angle of 45° to the main surface of the molded article 10. The staying time until the tape is peeled off after the tape is pasted to the molded article is set to within 1 minute. Such pasting-and-peeling-off procedure is conducted at the same surface of the molded article 30 times using a brand-new tape every time.

After that, the surface roughness Ra value is again measured at the surface where the operation of pasting and peeling the tape has been done. This surface roughness is regarded as after-operation surface roughness Ra2 [µm]. The difference in the surface roughness expresses by Ra value measured before and after the operation can be obtained by subtracting the after-operation surface roughness Ra2 from the initial surface roughness Ra1 (i.e., (Ra2−Ra1) [µm]). The value of the difference in surface roughness Ra is not affected by the time required for peeling, the period of time from the pasting to the peeling and the like if the operation of pasting and peeling the tape is conducted as mentioned above.

The method and conditions for producing a molded article of the present invention is not limited as long as they can provide the article having a surface with difference of 0.4 µm or smaller in a surface roughness measured before and after the operation of pasting and peeling the tape. If the molded article having a surface with difference of larger than 0.4 µm in a surface roughness measured before and after the operation of pasting and peeling the tape is obtained and used as a component in a device, the molded article tends to generate fine particles easily and tends to decrease in production yield and induce false operation with the lapse of use time of the component. The smaller the difference in a surface roughness measured before and after the operation of pasting and peeling the tape is, the more preferable the molded article becomes. The difference is preferably in the range of from 0.3 µm or smaller, and more preferably in the range of from 0.2 µm or smaller. As mentioned above, using a molded article of the present invention, or conducting a molding method and condition which are capable of producing the molded article of the present invention to produce the article, the generation of the particles in its use as a component for a device with the lapse of use time can be predicted to be small even if the component is not subjected to a durability test for a long period of time in advance. From such a viewpoint of producing components stably, the present invention is extremely useful.

An appropriate method and conditions for producing a molded article of the present invention can be decided by molding in advance a resin composition comprising a liquid crystalline polymer and a fibrous filler to have a small-size plate-shaped article (for example, an article having a dimensional of 64 mm×64 mm×1 mm) of the present invention. The same method and conditions as those for producing the small-size plate-shaped article of the present invention can be applied for producing any size and shape of the molded article of the present invention.

The liquid crystalline polymer to be used in the present invention may be a polymer showing an optical anisotropy at melting and that forms an anisotropic molten state at a temperature of 500° C. or lower. The optical anisotropy can be confirmed by a commonly-known polarization inspection method using an orthogonal polarizer. The liquid crystalline polymer may be a polymer having a long, narrow and flat molecular chain (which may be called as "a mesogen group")

with a high rigidity along the long chain in either one of or both of its polymer main chain and side chain. The liquid crystalline polymer having the mesogen group in its polymer main chain is preferably used in the present invention when the resulting molded article with higher heat resistance is desired.

Examples of the liquid crystalline polymer to used in the present invention include a liquid crystalline polyester, a liquid crystalline polyesteramide, a liquid crystalline polyesterether, a liquid crystalline polyestercarbonate, a liquid crystalline polyesterimide, a liquid crystalline polyamide and the like. Among these, from the viewpoint of obtaining the resulting resin molded article with high strength, the liquid crystalline polyester, the liquid crystalline polyesteramide and the liquid crystalline polyamide are preferably used.

Examples of the preferred liquid crystalline polymer include a liquid crystalline polymer selected from group (a), (b) and (c) below:

(a) polyester, polyesteramide and polyamide having a Structural Unit (I) below and/or a Structural Unit (II) below;

(b) polyester and polyesteramide having a Structural Unit (III) below, and a Structural Unit (IV) below and a structural unit selected from the Structural Units (I) and (II); and (c) polyester and polyesteramide having the Structural Unit (III); a structural unit selected from the Structural Units (I) and (II); and a structural unit selected from the Structural Unit (IV), a Structural Unit (V) and a Structural Unit (VI),

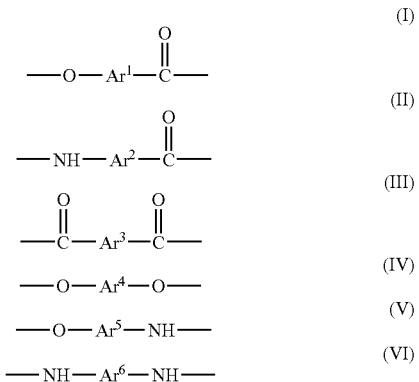

wherein $Ar^1$, $Ar^2$, $Ar^5$ and $Ar^6$ each independently represents a bivalent aromatic group; and $Ar^3$ and $Ar^4$ each independently represents a group selected from a bivalent aromatic group, a bivalent alicyclic group and a bivalent aliphatic group; and in $Ar^1$ to $Ar^6$, a part or all of hydrogen atoms on the aromatic ring in the aromatic groups may be substituted with a halogen atom, an alkyl group having 1 to 10 carbon atoms, an alkoxy group having 1 to 10 carbon atoms, or an aryl group having 6 to 10 carbon atoms, a part or all of hydrogen atoms in the alicyclic group may be substituted with an alkoxy group having 1 to 10 carbon atoms or an aryl group having 6 to 10 carbon atoms, and a part or all of hydrogen atoms in the aliphatic group may be substituted with an alkoxy group having 1 to 10 carbon atoms or an aryl group having 6 to 10 carbon atoms.

Examples of the aromatic group in the above-described structural units include a group obtained by removing two hydrogen atoms bonding to the aromatic ring of the aromatic compound selected from the group consisting of a monocyclic aromatic compound, a condensed aromatic compound, and an aromatic compound in which a plurality of aromatic rings are linked by a bivalent linking group (including a single bond) such as benzene, naphthalene, biphenylene, diphenylether, diphenylsulfone, diphenylketone, diphenylsulfide, and diphenylmethane. A bivalent aromatic group selected from bisphenyl-2,2-propylidene, a 1,4-biphenylene group, a 1,3-phenylene group, a 2,6-naphthalenediyl group, and a 4,4'-biphenylene group, is preferable, and the liquid crystalline polymer in which the aromatic group is such a group is preferable because it has the tendency of being superior in mechanical strength.

The Structural Unit (I) is a structural unit which can be derived from aromatic hydroxy carboxylic acid. Examples of the aromatic hydroxy carboxylic acid include 4-hydroxy benzoic acid, 3-hydroxy benzoic acid, 6-hydroxy-2-naphthoic acid, 7-hydroxy-2-naphthoic acid, 6-hydroxy-1-naphthoic acid, 4'-hydroxybiphenyl-4-carboxylic acid, and aromatic hydroxy carboxylic acids in which a part or all of the hydrogen atoms on an aromatic ring in the above-mentioned aromatic hydroxy carboxylic acids is substituted with an alkyl group, an alkoxy group, a halogen atom or the like. Examples of the alkyl group include a straight-chain, branched-chain or cyclic-type alkyl group having 1 to 10 carbon atoms, such as a methyl group, an ethyl group, a propyl group, an isopropyl group, a butyl group, a tert-butyl group, a hexyl group, a cyclohexyl group, an octyl group and a decyl group. Examples of the alkoxy group include a straight-chain, branched-chain, or cyclic-type alkoxy group having 1 to 10 carbon atoms, such as a methoxy group, an ethoxy group, a propoxy group, an isopropyoxy group, a butoxy group, a tert-butoxy group, a hexyloxy group, a cyclohexyloxy group, an octyloxy group and decyloxy group. Examples of the aryl group include an aryl group having 6 to 10 carbon atoms, such as a phenyl group and a naphthyl group. The halogen atom is selected from a fluorine atom, a chlorine atom, a bromine atom and an iodine atom.

The Structural Unit (II) is a structural unit which can be derived from aromatic amino carboxylic acid. Examples of the aromatic amino carboxylic acid include 4-amino benzoic acid, 3-amino benzoic acid, 6-amino-2-naphthoic acid, and aromatic amino carboxylic acids in which a part or all of the hydrogen atoms on an aromatic ring in the above-mentioned aromatic amino carboxylic acids is substituted with an alkyl group, an alkoxy group, an aryl atom or a halogen atom. Here, examples of the alkyl group, the alkoxy group, the aryl group and the halogen atom are the same as in the examples of the above-described aromatic hydroxy carboxylic acid.

The Structural Unit (V) is a structural unit which can be derived from aromatic hydroxylamine. Examples of the aromatic hydroxyamine include 4-aminophenol, 3-aminophenol, 4-amino-1-naphthol, 4-amino-4'-hydroxydiphenyl, and aromatic hydroxyamines in which a part or all of the hydrogen atoms on an aromatic ring in the above-mentioned aromatic hydroxyamines is substituted with an alkyl group, an alkoxy group, an aryl group or a halogen atom. Here, examples of the alkyl group, the alkoxy group, the aryl group and the halogen atom are the same as in the examples of the above-described aromatic hydroxy carboxylic acid.

The Structural Unit (VI) is a structural unit which can be derived from aromatic diamine. Examples of the aromatic hydroxyamine include 1,4-phenyldiamine, 1,3-phenyldiamine, 4,4'-diaminophenylsulfide (which may be referred to as thiodianiline), 4,4'-diaminodiphenylsulfone, 4,4'-diaminodiphenylether (which may be referred to as "oxydianiline"), aromatic diamines in which a part or all of the hydrogen atoms on an aromatic ring in the above-mentioned aromatic diamines is substituted with an alkyl group, an alkoxy group, an aryl group or a halogen atom, and aromatic diamines in which the hydrogen atom bonding to a primary amino group of the aromatic diamine as described above is substituted with an alkyl group. Here, examples of the alkyl group, the alkoxy group, the aryl group and the halogen atom are the same as in the examples of the above-described aromatic hydroxy carboxylic acid.

Examples of $Ar^3$ in the above-described Structural Unit (III) and examples of $Ar^4$ in the Structural Unit (IV) include bivalent aliphatic groups and divalent alicyclic groups obtained by removing two hydrogen atoms from saturated aliphatic compounds having about 1 to 10 carbon atoms, in addition to the same example aromatic groups as in $Ar^1$, $Ar^2$, $Ar^5$, and $Ar^6$ as mentioned above.

The Structural Unit (III) is a group which can be derived from aromatic dicarboxylic acid or aliphatic dicarboxylic acid. Examples of the aromatic dicarboxylic acid include terephthalic acid, phthalic acid, 4,4'-diphenyl dicarboxylic acid, 4,4''-triphenyl dicarboxylic acid, 2,6-naphthalene dicarboxylic acid, diphenylether-4,4'-dicarboxylic acid, isophthalic acid, diphenylether-3,3'-dicarboxylic acid, 2,2-bis(4-hydroxyphenyl)propane[bisphenol A], and aromatic dicarboxylic acids in which a part or all of the hydrogen atoms on an aromatic ring in the above-mentioned aromatic dicarboxylic acids is substituted with an alkyl group, an alkoxy group, an aryl group or a halogen atom.

Examples of the aliphatic dicarboxylic acid includes alicyclic dicarboxylic acid such as malonic acid, succinic acid, adipic acid, trans-1,4-cyclohexane dicarboxylic acid, cis-1,4-cyclohexane dicarboxylic acid, and 1,3-cyclohexane carboxylic acid; trans-1,4-(1-methyl)cyclohexane dicarboxylic acid, cis-1,4-(1-methyl)cyclohexane dicarboxylic acid, and aliphatic dicarboxylic acids in which a part or all of the hydrogen atoms of an aliphatic group or an alicyclic group in the above-mentioned aliphatic dicarboxylic acids is substituted with an alkoxy group, an aryl group or a halogen atom.

Examples of the alkoxy group, the aryl group, and the halogen atom are the same as in the examples of the above-described aromatic hydroxy carboxylic acid.

The Structural Unit (IV) is a group which can be derived from aromatic diol or aliphatic diol, and examples of the aromatic diol include hydroquinone, resorcine, naphthalene-2,6-diol, 4,4'-biphenylenediol, 3,3'-biphenylenediol, 4,4'-dihydroxydiphenylether, 4,4'-dihydroxydiphenylsulfone, and aromatic diols in which a part or all of the hydrogen atoms on an aromatic ring in these aromatic diols is substituted with an alkyl group, an alkoxy group, an aryl group or a halogen atom.

Examples of the aliphatic diol include ethylene glycol, propylene glycol, butylenediol, neopentyl glycol, 1,6-hexanediol, trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanedimethanol, trans-1,3-cyclohexanedimethanol, and aliphatic diols in which a part or all of the hydrogen atoms of an aliphatic group or an alicyclic group in the above-mentioned aliphatic diols is substituted with an alkoxy group, an aryl group, or a halogen atom.

Examples of the alkoxy group and the halogen atom are the same as the examples of the above-described aromatic hydroxy carboxylic acid.

The liquid crystalline polymer in the groups (b) and (c) described above may have an alicyclic group and/or an aliphatic group in the Structural Unit (III) and the Structural Unit (IV). The amount of such an alicyclic group and/or an aliphatic group in the liquid crystalline polymer may be decided in the range where the liquid crystalline polymer expresses liquid crystallinity and does not spoil its heat resistance considerably. The heat resistance of the resulting molded article may be affected by the amount of the alicyclic and/or an aliphatic group. The larger amount of aromatic groups the liquid crystalline polymer has, the higher heat resistance the liquid crystalline polymer tends to have, which is preferred.

In the present invention, it is preferred to use a liquid crystalline polymer selected from the group (a) described above and the groups (b)' and (c)' respectively described below:

(b)' a liquid crystalline polymer selected from the group (b) described above in which the total amount of the bivalent aromatic group of the polymer is 60% by mole or more on the basis of the total amount of $Ar^1$, $Ar^2$, $Ar^3$ and $Ar^4$ of the polymer; and (c)' a liquid crystalline polymer selected from the group (c) described above in which the total amount of the bivalent aromatic group of the polymer is 60% by mole or more on the basis of the total amount of $Ar^1$, $Ar^2$, $Ar^3$, $Ar^4$, $Ar^5$ and $Ar^6$ of the polymer.

In the liquid crystalline polymer selected from the group (b)' and (c)', the total amount of the bivalent aromatic group is preferably 75% by mole or more, and is more preferably 90% by mole or more. The liquid crystalline polymer in which the total amount of the bivalent aromatic group is 100% by mole, that is so-called "wholly aromatic liquid crystalline polymer", is much more preferred.

Among such aromatic liquid crystalline polymers exemplified as described above, the polyester in the group (a) and the polyester in the group (b) are preferably used, and especially the polyester in the group (b) is more preferably used. Further, among such preferred polymers, the polyester and polyester having the following structural units have advantages such that the polyester can provide a molded article excellent in heat resistance, high mechanical strength and flame retardancy while having excellent injection molding processability. That is, it is preferred to use the polyester and polyester having the unit as follows:

a structural unit derived from at least one aromatic hydroxy carboxylic acid selected from the aromatic hydroxy carboxylic acid (I-1) and (I-2) below;

a structural unit derived from at least one aromatic dicarboxylic acid selected from aromatic dicarboxylic acids (III-1), (III-2) and (III-3) below; and a structural unit derived from at least one aromatic diol selected from aromatic dicarboxylic acids (IV-1), (IV-2), (IV-3) and (IV-4) below

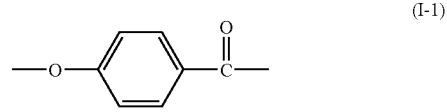

(I-1)

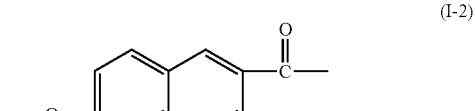

(I-2)

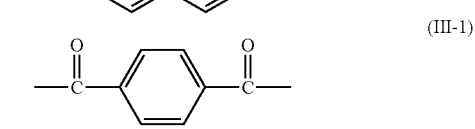

(III-1)

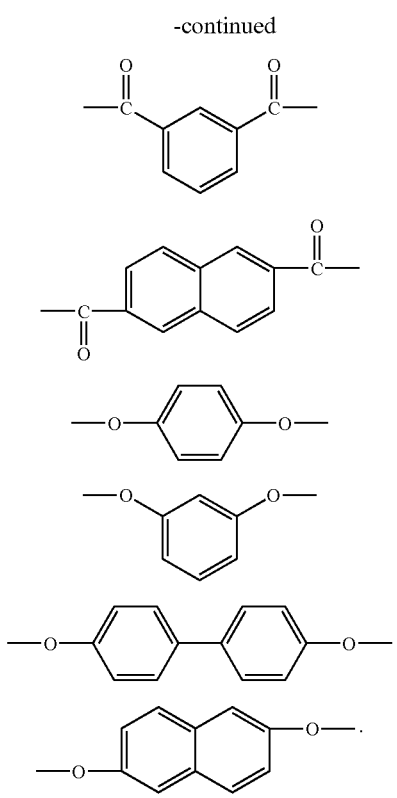

(III-2)
(III-3)
(IV-1)
(IV-2)
(IV-3)
(IV-4)

The liquid crystalline polymers described above can be produced, for example, by the known polymerization methods using monomers mentioned below.

Examples of the monomers for producing the polymer in the group (a) include aromatic hydroxy carboxylic acid and/or aromatic amino carboxylic acid. Examples of the monomers for producing the polymer in the group (b) include at least one selected from aromatic hydroxy carboxylic acid and aromatic amino carboxylic acid, at least one selected from aromatic dicarboxylic acid and aliphatic dicarboxylic acid and at least one selected from aromatic diol and aliphatic diol. Examples of the monomers for producing the polymer in the group (c) include at least one selected from aromatic carboxylic acid and aromatic amino carboxylic acid, at least one selected from aromatic dicarboxylic acid and aliphatic dicarboxylic acid and at least one selected from aromatic diol, aliphatic diol, aromatic hydroxylamine and aromatic diamine.

The preferred polyester in the group (b) can be produced using aromatic hydroxy carboxylic acid, aromatic dicarboxylic acid and aromatic diol as monomers.

The monomers mentioned above may be directly polymerized to produce the liquid crystalline polymer corresponding to the monomers Alternatively, the polymerization can be conducted using an ester-forming derivative or an amide-forming derivative (hereinafter referred to as "ester-forming derivative" and "amide-forming derivative", respectively) made from the monomers. When the ester-forming or amide-forming derivative is used, the polymerization can easily proceed, desirably. The ester-forming and amide-forming derivatives are monomers having a group that promotes an ester production reaction or an amide production reaction. Examples of the ester-forming and amide-forming derivatives includes a compound in which a carboxylic acid group in a monomer is converted to an ester group with a haloformyl group, an acid anhydride and lower alcohol; a compound in which a phenolic hydroxy group and a phenolic amino group in a monomer is converted to an ester group and an amide group, respectively.

The preferred polyester in the group (b) can be produced by a polymerization method using an acylated substance as an ester-forming derivative, which is described in Japanese Patent Application Laid-Open No. 2002-146003. For example, phenolic hydroxy groups of aromatic hydroxy carboxylic acid and aromatic diol are converted to acyl groups (using acid anhydride, preferably acetic anhydride) to prepare the acylated substance corresponding to the acid and diol. Then, the acylated substance are subjected to a de-acetic acid polymerization with an aromatic dicarboxylic acid so as to proceed to transesterification of the acyl group in the acylated substance and the carboxyl group in the aromatic dicarboxylic acid, to produce the polyester. The de-acetic acid polymerization can be conducted by a melt polymerization of the acylated substance and the aromatic dicarboxylic acid at a reaction temperature of 150 to 400° C. over about 0.5 to 8 hours, to obtain a polyester having a relatively low molecular weight. The melt polymerization can be followed by a solid-phase polymerization in which the polyester with a relatively low molecular weight is used as a pre-polymer. For example, the pre-polymer obtained in the melt polymerization is made into a powder thereof, which is then heated in a solid state to carried out the solid-phase polymerization. The solid-phase polymerization is preferably conducted because the polymerization proceeds further to increase a molecular weight of the resulting polyester.

In the present invention, a fibrous filler is used to improve the strength of the resulting resin molded article of the present invention. As for a material of the fibrous filler, an inorganic substance is preferred in order to obtain a resin molded article with higher strength. Examples of the material of the fibrous filler include a glass fiber, a PAN-based carbon fiber, a pitch-based carbon fiber, an alumina fiber, a silica fiber and a silica-alumina fiber. Among them, the glass fiber is more preferred considering availability and wear load given to an apparatus for molding the resulting resin composition containing the fiber.

A resin molded article of the present invention may be produced by a method comprising the steps of:
melt-mixing and pelletizing a liquid crystalline polymer and a fibrous filler to obtain a resin composition pellet; and
molding the resin composition pellet.

When preparing the resin composition pellet, one or more kind of additives (mentioned below) may be added thereto. In view of improving the strength, the fibrous filler in the resin composition pellet preferably has a fiber diameter of from 5 to 15 μm and a number-average fiber length of from 30 to 200 μm. Namely, a resin molded article of the present invention may be produced by a method comprising the step of molding a resin composition pellet which contains a liquid crystalline polymer and a fibrous filler having a fiber diameter of 5 to 15 μm and a number-average fiber length of 30 to 200 μm. When the fiber diameter and the number-average fiber length of the fibrous filler is within the above-described range, the strength of the obtained resin molded article (especially, the weld strength showing the strength of a welded surface between flow terminals) further improves, and also, the surface roughness of the obtained resin molded article tends to hardly increase and the above-mentioned fine particles tend to be hardly generated. In order to decrease the difference in a surface roughness expressed by Ra value measured before and after the operation of pasting and peeling the tape, or in order to improve the strength of the resulting article, the fibrous filler in the resin composition pellet more preferably has a fiber diameter of from 6 to 12 µm and a number-average fiber length of from 50 to 150 µm.

The fiber diameter and the number-average fiber length of the fibrous filler in the resin composition pellet as mentioned above can be measured by the following method:

First, the resin composition pellet is burned at a temperature of about 600° C. or higher to make an ash thereof, which is dispersed on a slide glass with methanol. The photo picture of the dispersed ash on the slide glass is taken using a microscope, to measure diameter and length of at least 400 fibrous fillers in the ash. The average values of the diameter and length of fibrous fillers obtained from the measurement can be regarded as the fiber diameter and the number-average fiber length of the fibrous filler in the resin composition pellet as mentioned above.

The fibrous filler is preferably a fibrous filler in which a surface treatment is not carried out using a coupling agent such as a silane coupling agent and a titanium coupling agent or using a resin such as a thermosetting resins and a thermoplastic resins. When the fibrous filler with no surface treatment is used, the generation of gas from the resulting resin molded article is reduced to increase chemical stability of the article. Also, the fibrous filler with no surface treatment has advantages in producing electric and electronic devices and optical devices comprising the resin article having the filler, such that the gas generation is reduced so that the components of the devices are less polluted by the gas.

In order to produce a resin molded article of the present invention, pellets of resin composition comprising the liquid crystalline polymer and the fibrous filler (both mentioned above) may be utilized. The pellets preferably contain 5 to 250 parts by weight of the fibrous filler based on 100 parts by weight of the liquid crystalline polymer contained together therein. When the fibrous filler exceeds 250 parts by weight, injection molding processability of the resulting pellets may decrease, and the resulting resin molded article tends to have low mechanical strength and to become fragile. On the other hand, when the amount of fibrous filler is smaller than 5 parts by weight, dimensional stability of the resin molded article may decrease so that the molded article with a desired dimension tends to be hardly obtained, and also, anisotropy of the liquid crystalline polymer may appear strongly in the molded article, and therefore, a warping or the like tends to be generated in the molded article. Further, smaller amount of fibrous filler used may result in reducing improvement in mechanical strength of the resulting molded article.

In view of balance in the above-described characteristics of the pellets, the amount of the fibrous filler in the pellets may be 10 to 150 parts by weight, is preferably 25 to 100 parts by weight, and is more preferably 40 to 70 parts by weight, based on 100 parts by weight of the liquid crystalline polymer contained together in the pellets.

Moreover, other components (such as additives) may be included in the above-described composition pellet to the extent that the objective of the present invention is not adversely affected. Examples of such a third component include a whisker, a coloring component, a lubricant and various stabilizers. However, in the case of using such a third component, the possibility of reducing chemical stability of the resulting resin molded article, polluting the surroundings due to gas generation and the like need to be considered, as described regarding the fibrous filler mentioned above.

The above-described composition pellet can be prepared by various known methods. In pelletizing, it is preferred not to cut a fibrous filler to be too much short-length filler. For example, a composition pellet comprising a liquid crystalline polymer and a fibrous filler may be prepared by heat-melting the liquid crystalline polymer in advance with an extruder and, and then adding and kneading a fibrous filler and an optional component. Alternatively, the composition pellet may be prepared by mixing a liquid crystalline polymer, a fibrous filler and an optional component all together using a Henschel mixer, a tumbler, or the like to obtain a mixture thereof, and melt-kneading the mixture using an extruder to pelletize the mixture. Due to difficulty in obtaining a too much short-length filler and due to easy handling, a biaxial kneading extruder is preferably used as the extruder.

In order to avoid obtaining a too much short-length fibrous filler in pelletizing, the temperature at mixing, the temperature at melt-kneading, shearing force and the like may be appropriately selected. For example, the mixing may be conducted at a temperature of from 0° C. to the flow starting temperature (which is called FT 0 (° C.)) of the liquid crystalline polymer to be mixed. When the mixing is conducted at a temperature higher than FT 0° C., it tends to be difficult for the filler and the optional component to be uniformly dispersed in the resulting pellet. In practice, the mixing may be conducted at a temperature of from 20 to 200° C. for 0.001 to 5 hours, preferably for 0.01 to 3 hours. The melt-kneading may be conducted at a temperature higher than the flow starting temperature of the resin composition by 10° C. (which is FT+10 (° C.)) to a temperature higher than the flow starting temperature by 80° C. (which is FT+80 (° C.)). The shearing force in melt-kneading, including shearing force by the extruder, can be appropriately selected depending on a type of and a scale of the extruder used. The conditions of the mixing and melt-kneading can be optimized by way of measuring the degree of shortening the fibrous filler so that the number-average fiber length of the filler is in the range mentioned above. Alternatively, using a relatively long-length filler, the number-average fiber length of the filler can be controlled so as to be in the range mentioned above by way of cutting the filler during the melt-kneading step with a strong shearing force. In view of avoiding damage of melt-kneading machine and low cost, it is preferred to maintain the fiber length during the mixing and melt-kneading steps. Namely, it is preferred to prepare a pellet containing a liquid crystalline polymer and a fibrous filler using a fibrous filler having a number-average fiber length of from 50 to 500 µm, so that the fiber length is not shortened too much during the mixing and melt-kneading steps for the pelletizing. The diameter of filler tends to be maintained in preparing the pellet, and therefore, a fibrous filler having a fiber diameter in the range mentioned above (i.e., a fiber diameter of form 5 to 15 µm) may be utilized for preparing the pellet. The flow starting temperature FT 0 (° C.) mentioned above of the liquid crystalline polymer is preferably higher than 200° C., and 500° C. or lower. When the liquid crystalline polymer having the flow starting temperature FT 0 (° C.) in such a range is used, the resulting resin molded article tends to have excellent heat resistance, desirably.

As mentioned above, it is preferred in the present invention that the resin composition pellet containing a liquid crystalline polymer and a fibrous filler is prepared and then the molding of the resin composition pellet is conducted to obtain a resin molded article. In such a case, the resin can be easily handled in the molding such as injection molding.

<Method for Molding Resin Molded Article>

A resin molded article of the present invention can be obtained by injection molding the resin composition pellet mentioned above. One example of such a molding is described as follows:

First, a flow starting temperature FT (° C.) of the resin composition pellet is measured. Here, the flow starting temperature of the resin composition pellet is a temperature at which the resin composition pellet melts in a plasticizing apparatus of the injection molding machine. In many cases, the flow starting temperature of the resin composition pellet is the same as that of the liquid crystalline polymer in the resin composition pellet. The flow starting temperature is a temperature at which the resin or composition to be measured has a melt viscosity of 4800 Pa·s (4800 poise) while heating the resin or composition at a temperature-increasing rate of 4° C./min under a load of 9.81 MPa (100 kgf/cm$^2$) using a capillary rheometer having a nozzle (with inner-diameter of 1 mm and length of 10 mm) and extruding the resulting melted resin or composition from the nozzle. It is known that the flow starting temperature is an index indicating a molecular weight of liquid crystalline polymer (see, for example, "Synthesis, Molding, and Application of Crystalline Polymer" edited by Naoyuki Koide, p. 95 to 105, published by CMC Publishing Co., Ltd., on Jun. 5, 1987). The flow starting temperature mentioned in the present specification was measured using a flow characteristics evaluation machine "FLOW TESTER CFT-500D", manufactured by Shimadzu Corporation.

In view of reducing particle generation of the resin molded article, the resin molded article of the present invention is preferably produced by a method comprising the steps of:

melting the resin composition pellet at a temperature of from a temperature higher than the flow starting temperature (FT (° C.)) of the resin composition by 30° C. (i.e., [FT+30] (° C.) or higher) to a temperature higher than the flow starting temperature by 80° C. (i.e., [FT+80] (° C.) or higher) to obtain a melted resin composition; and injecting the melted resin composition into a mold having a set temperature of 80° C. or higher to mold the composition. The resin composition pellet is preferably dried before the injection molding.

The particle generation of the resin molded article may depend on the melting temperature of the resin in molding and the temperature of mold for the injection. For example, when the injection molding is performed at which the resin melting temperature is lower than [FT+30]° C., then the surface strength of the resulting resin molded article tends to decrease, the generation of the particles tends to be promoted, and fluidity of the resin or composition in molding may decreases remarkably, which is undesirable. On the other hand, when the injection molding is performed at which the resin melting temperature is higher than [FT+80]° C., then decomposition of the liquid crystalline polymer in the molding machine may occur, and as a result, de-gassing, etc., may easily occur in the resulting resin molded article, and it tends to become difficult to use the resin molded article as electric/electronic components and in optical devices. Also, in the latter case, the melted resin tends to be easily flown out from the nozzle, undesirably when taking the resulting resin molded article out of the mold after the injection molding, which may result in decreasing productivity of the resin molded article. Considering the stability and molding properties of the resin molded article, the resin melting temperature is more preferably in the range of from [FT+30]° C. to [Ft+60]° C.

The temperature of the mold in injection machine is preferably 80° C. or higher, as described above. When the temperature of the mold is lower than 80° C., then the surface smoothness of the resulting resin molded article may be adversely affected, which tends to promote the generation of particles. Although a higher temperature of the mold is more advantageous from a viewpoint of reducing the amount of particles generated, too much high temperature of the mold is not preferred since productivity may decrease due to long period of time for cooling the mold, and the resulting molded article may be deformed due to decrease in mold releasability, and furthermore, engagement among the molds tends to become bad, which may results in generating a risk of damaging the the resulting molded article when the mold is opened or closed. The upper limit of the temperature of the mold is preferably optimized appropriately depending on the type of the resin composition pellets as well for preventing decomposition of the liquid crystalline polymer contained in the resin composition pellet. In the case that the preferable whole aromatic polyester mentioned above is used as the liquid crystalline polymers in the present invention, the temperature of the mold is preferably in the range of from 100° C. to 220° C., and more preferably in the range of from 130° C. to 200° C.

When more practical and more preferable injection molding conditions are demanded, preliminary experiments of injection molding may be conducted, although such preliminary experiments are not essential in the present invention. For example, the preliminary experiments be carried out in such a way that the plate-shape molded articles (mentioned above just for simplifying; and which can be used as "standard molded articles") are produced in the same manner as mentioned above except that the mold temperatures and the resin melting temperatures are changed, and then the molded articles thus obtained are subjected to the surface tape-peeling test to determine the optimized conditions of the molding temperatures and the like. More specifically, one example of the preliminary experiments be conducted as follows:

The plate-shape molded article is obtained by melting a resin composition pellet at a center temperature of the preferable range of resin melting temperature, which is from [FT+40]° C. to [FT+50]° C., injection-molding the melted composition in the mold at the set temperature of about 80° C. Here, the flow starting temperature FT of the resin composition pellet has been obtained in advance. The plate-shape molded article is then subjected to the surface tape-peeling test to obtain difference in Ra value measured before and after the surface tape-peeling test. Such a molding is repeatedly conducted while gradually raising the mold temperature to obtain difference in Ra value measured before and after the surface tape-peeling test for each molded article obtained under the each mold temperature. In the same manner, the molding is repeatedly conducted while gradually lowering the resin melting temperature to obtain difference in Ra value measured before and after the surface tape-peeling test for each molded article obtained under the each resin melting temperature. Based on such results of preliminary experiments, the conditions of molding such as mold temperature and resin melting temperature can be optimized. If in the preliminary experiments, the molded articles are subjected to a test for measuring mechanical strength (such as weld strength) of the articles in addition to the surface tape-peeling test, then the more preferable molding conditions can be obtained in view of mechanical strength of the resulting article.

Injection speed of the molding in the preliminary experiments can be set in various preferred ranges depending on the molding machine to be used. For example, the molding can be conducted at an injection speed of about 50 mm/sec or higher.

The above-obtained optimized injection-molding conditions can be applied to the molding for producing the aimed article only by replacing the mold for obtaining the standard molded articles with the mold for obtaining the aimed article. In such a manner, a resin molded article capable of reducing the particle generation can be obtained. Thus-obtained resin molded article can be preferably applied to a component for electric/electronics components and for optical devices.

It is noted that the above-described method for optimizing the molding conditions can be employed not only using the mold for the standard molded articles but also using the mold for the aimed article. When the mold for obtaining the resin article having a shape aimed at is used, the surface tape-peeling test is conducted at a plane surface of the article.

Examples of the component which can be provided in the present invention include electric/electronic component such as a connector, a socket, a relay component, a coil bobbin, an optical pick-up, an oscillator, a printed wiring board, a circuit board, a semiconductor package, and a computer related component; semiconductor-producing-process-related components such as an IC tray and a wafer carrier; home electric product components such as a VTR, a television, an iron, an air conditioner, a stereo, a vacuum cleaner, a refrigerator, a rice cooker, and a lighting fixture; light fixture components such as a lamp reflector and a lamp holder; audio product components such as a compact disk, a laser disk, and speaker; communication device components such as a ferrule for optical cable, a telephone component, a facsimile component, and a modem; copier and printer related components such as a separation claw and a heater holder; machine components such as an impeller, a fan gear, a gear, a bearing, a motor component, and a case; automobile components such as mechanical components for an automobile, an engine component, components in an engine room, electrical components, and interior components; cooking utensils such as a microwave cooking pot and a heat resistance tableware; construction materials and materials for civil engineering and construction such as materials for insulation and soundproofing such as a floor material and a wall material, supporting materials such as a beam and a pillar, and roofing materials; components for airplanes, spaceships, and space instruments; radiation facility materials such as a nuclear reactor, marine facility materials, cleaning devices, optical mechanism components, valves, pipes, nozzles, filters, films, medical machine components and medical materials, sensor components, sanitary equipments, sporting goods, and recreation goods.

As mentioned above, the resin molded article of the present invention can be used in various applications. Due to the reduced amount of particles, the molded article can be advantageously utilized in a switch, a relay, various sensors such as an image sensor, alight-emitting diode (LED) and an optical mechanism system; and is much useful especially in a switch, an image sensor, and a camera module component. Particularly, the resin molded article of the present invention useful in a camera module component.

Figure 4:
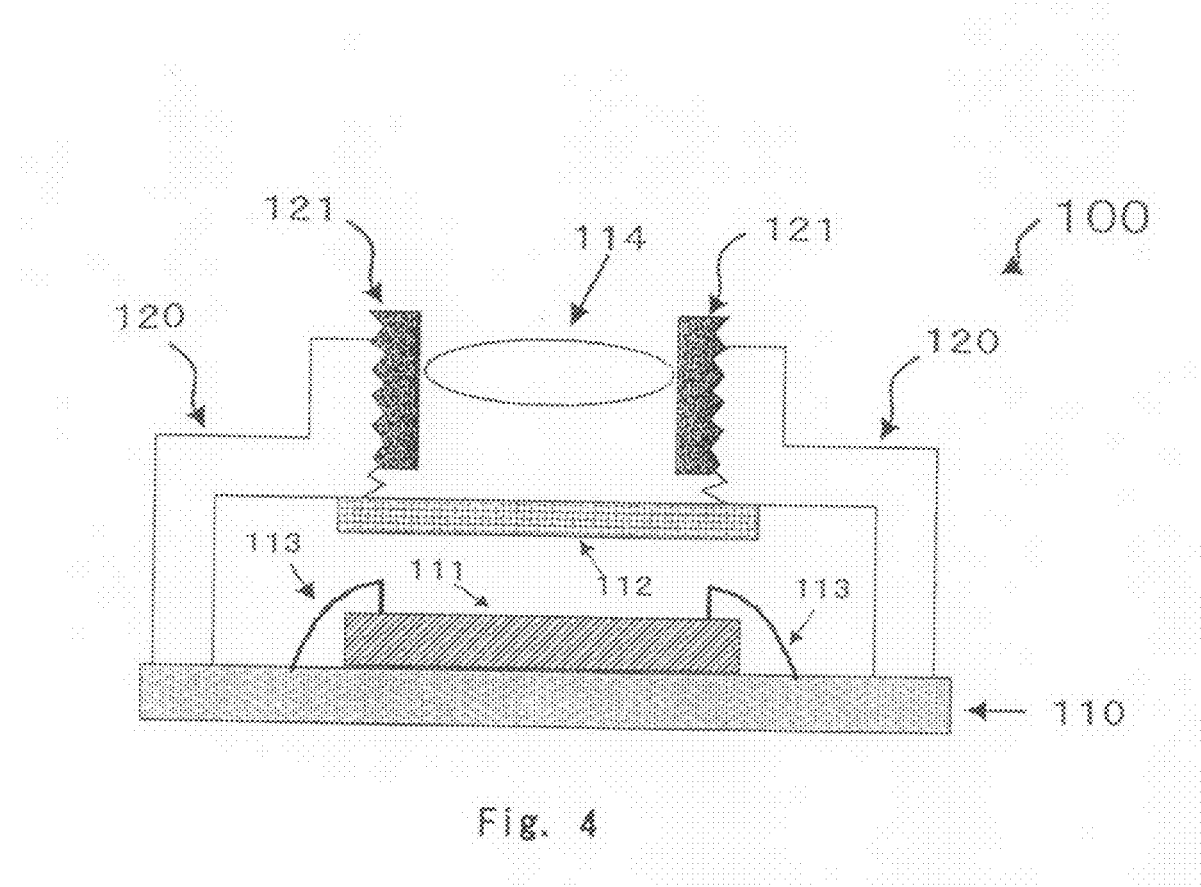
FIG. 4 is a schematic section view showing a camera module component.

FIG. 4 is a schematic section view showing one example of the camera module component 100 mentioned above. An optical element 111 is arranged on a substrate 110 and electrically bonded with the substrate by a lead wiring 113. A holder 120 having a vacant part on the top part is arranged so as to cover the optical element 111 to the substrate 110, and a spiral is provided in the vacant part. On the other hand, a camera module component is formed by arranging a barrel 121 attached with a lens 114 so as to screw with the spiral in the top part of the holder 120. Further, in the camera module component, an IR filter 112 is bonded to the holder 120 so that a light passing through the lens 114 is on the light path arriving to the optical element 111. Since the distance between the lens 114 and the optical element 111 is adjusted by sliding the barrel 121 that is screwed and the spiral part of the holder 120 in the focus adjustment in the camera module component, there are cases that these components easily wear in the lapse of time when the holder 120 and/or the barrel 121 is made of the resin molded article other than the molded article of the present invention. Once a lot of particles are generated from the holder 120 or the barrel 121 due to the wear of the components, the particles attach to the IR filter or the optical element, which may result in false operation of the camera module component. Furthermore, the particles may be easily generated more when the wear proceeds, when the surface of the holder 120 or the barrel 121 becomes rough due to vibration at use, etc.

When the resin molded article of the present invention is applied to the holder 120 and/or the barrel 121 in the camera module component 100, the particle generation due to wear can be prevented or at least extremely reduced, and a longer operation life of the camera module component 100 can be achieved by preventing the false operation due to the particles. Under the circumstances in recent years where miniaturization of a digital device as well as the camera module component and making the configuration components thinner have been advanced, the present invention can provide a resin article component which meets the demandings such as miniaturization by using the resin composition as mentioned above, that is excellent in thin moldability.

Figure 5:
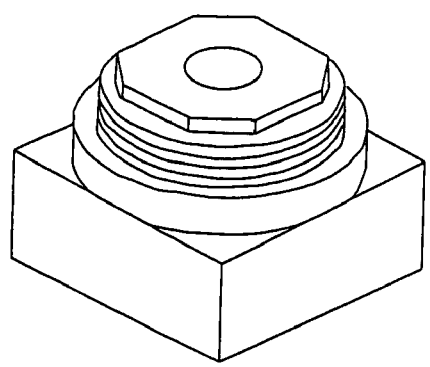
FIG. 5 is a schematic perspective view showing a camera module comprising a barrel and a holder.
Figure 6:
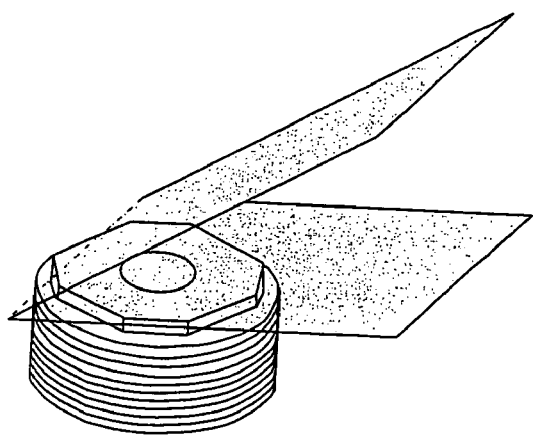
FIGS. 6 and 7 are schematic perspective views respectively showing a barrel and a holder for a camera module with a tape in conducting a tape-peeling test.
Figure 7:
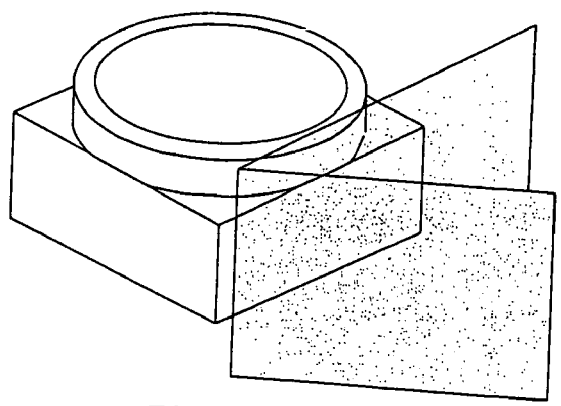

FIG. 5 is a schematic perspective view showing one example of the camera module comprising the barrel 121 and the holder 120. FIG. 6 is a schematic perspective view showing the barrel 121 with a tape in conducting the surface tape-peeling test. As shown in FIG. 6, the surface tape-peeling test for the barrel 121 can be employed so that the tape is pasted on and peeled off from a flat surface of an opening part of the barrel 121. FIG. 7 is a schematic perspective view showing the holder 120 with a tape in conducting the surface tape-peeling test. As shown in FIG. 7, the surface tape-peeling test for the holder 120 can be employed so that the tape is pasted on and peeled off from a flat surface of one of side surfaces of the holder 120. In the surface tape-peeling test, the width of the tape can be appropriately selected depending on the shape of components (such as the barrel 121 and the holder 120) to be subjected to the surface tape-peeling test.

Although the amount of the particles generated from the resin molded article (such as the camera module as mentioned above) of the present invention can be reduced in the lapse of time, the degree of the particle generation can be confirmed with an acceleration test as described below.

That is, a gate thorough which a resin is injected into a mold is cut out of the resin molded article, and the cutting part is sealed with a thermal caulking. Then, the surface of the article is cleaned by stirring gently for one minute in pure water of 500 cc, and the stirring is stopped to maintain the article for 10 minutes. The number of particles dispersed in the cleaning water is counted using a liquid particle counter system manufactured by Rion Co., Ltd. This particle counter system is configured from a syringe sampler KZ-30W1 (extracts the particle dispersion liquid), a particle sensor KS-65, and a controller KL-11A. The particles with a size of 2 μm to 100 μm in 10 ml of the sample cleaning water are counted to show the number of particles per one milliliter (ml) of sample. The measurement is performed five times per every sample, and the average amount of the particles in the 5-time measurement is regarded as the amount of particles generated from each article. When the generated amount of particles is 100 particles/ml or larger, the frequency of the particle generation from the resin molded article tends to become large, and the possibility of generating an operation failure of the electric/electronic component and the optical device tends to become high.

The number of particles measured in such a counting method in the acceleration test is smaller than 100 particles/ml in the present invention. As such, the particles are extremely hardly generated from the molded article of the present invention even in such an acceleration test, and therefore, it is possible to prevent occurrence of operation failure even when the molded article is worn in the lapse of use time, as in the above-described camera module.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2007-045155 filed on Feb. 26, 2007 including specification, claims, drawings and summary are incorporated herein by reference in their entirety.

EXAMPLES

The present invention is described in more detail by following Examples, which should not be construed as a limitation upon the scope of the present invention.

Producing of Liquid Crystalline Polymer (Polyester)

Production Example 1

P-hydroxybenzoic acid (994.5 g, 7.2 mol), 2,4'-dihydroxybiphenyl (446.9 g, 2.4 mol), terephthalic acid (299.0 g, 1.8 mol), isophthalic acid (99.7 g, 0.6 mol), and acetic anhydride (1347.6 g, 13.2 mol), and 1-methylimidazole (0.194 g) as a catalyst were charged into a reactor equipped with a stirring apparatus, a torque meter, a nitrogen gas introduction pipe, a thermometer, and a reflux condenser, and were stirred at room temperature for 15 minutes, the inside of the reactor was sufficiently replaced with nitrogen gas, and the temperature was increased while stirring. When the inner temperature was 145° C., it was stirred for 1 hour while maintaining the same temperature.

After that, a pre-polymer was obtained by increasing the temperature to 320° C. in 2 hours and 50 minutes while distilling distilled bi-product acetic acid and non-reacted acetic anhydride and considering the point when the torque was confirmed to increase as the end of the reaction. The flow starting temperature of the pre-polymer was 261° C.

A powder of liquid crystalline polyester (particle diameter of about 0.1 mm to about 1 mm) was obtained by cooling the obtained pre-polymer to room temperature and grinding with a coarse grinder, a polymerization reaction was proceeded in a solid phase by increasing the temperature from room temperature to 250° C. over 1 hour, increasing the temperature from 250° C. to 285° C. over 5 hours, and maintaining the temperature at 285° C. for 3 hours. The flow starting temperature of the obtained polyester was 327° C. The polyester obtained in such a manner is referred to as LCP1.

Production Example 2

A pre-polymer was obtained in the same manner as in Production Example 1 except that the amount of terephthalic acid was changed from 299.0 g to 365.4 g (2.2 mol) and the amount of isophthalic acid was changed from 99.7 g to 33.2 g (0.2 mol). The flow starting temperature of the pre-polymer was 263° C.

A powder of liquid crystalline polyester (particle diameter of about 0.1 mm to about 1 mm) was obtained by cooling the obtained pre-polymer to room temperature and grinding with a coarse grinder, a polymerization reaction was proceeded in a solid phase by increasing the temperature from room temperature to 250° C. over 1 hour, increasing the temperature from 250° C. to 300° C. over 5 hours, and maintaining the temperature at 300° C. for 3 hours. The flow starting temperature of the obtained polyester was 361° C. The polyester obtained in such a manner is referred to as LCP2.

Examples 1 to 6 and Comparative Examples 1 to 11

Resin composition pellets were obtained by granulating the liquid crystalline polymers LCP1 and LCP2 obtained in Production Examples 1 and 2 together with other materials in the respective amounts shown in Tables 1, 2 and 3 at a cylinder temperature of 340° C. using a biaxial extruder (PCM-30 manufactured by Ikegai, Ltd.). The flow starting temperature (FT: flow temperature) of the obtained resin composition pellets were measured with the method described above.

<Fibrous Filler>
mGF (milled glass fiber):
    Milled fiber/glass fiber EFH75-01 manufactured by Central Glass Co., Ltd. (Size announced by the maker: fiber diameter 10 µmϕ×fiber length 75 µm).
cGF (chopped glass fiber):
    Glaslon chopped strand CS03 JA PX-1 manufactured by Asahi Fiber Glass Co., Ltd. (Size announced by the maker: fiber diameter 10 µmϕ×fiber length 3 mm).

<Other Fillers>
Titanium dioxide:
    Titanium dioxide TIPAQUE CR-60 manufactured by Ishihara Sangyo Kaisha, Ltd. (Average particle size: 0.2 µm).
Talc:
    Talc TALC X-50 manufactured by Nippon Talc Co., Ltd. (Plate-shape filler, Mean particle diameter: 14.5 µm).
Polytetrafluoroethylene:
    Polytetrafluoroethylene CEFRAL LUBE I manufactured by Central Glass Co., Ltd. (Mean particle diameter: 3-8 µm).
BAW (aluminum borate whisker):
    BAW manufactured by Shikoku Kasei Co., Ltd. (Size announced by the maker: fiber diameter 0.5-1.0 µmϕ×fiber length 10-30 mm).

<Measurement of Number-Average Fiber Length of Fibrous Filler>

A portion of the composition pellets obtained above was provided for a measurement of the number-average fiber length of the fibrous filler in the pellets, as described below.

The pellet (1 g) to be measured was placed in a crucible, and was burn to be ashes at a temperature of 600° C. for 6 hours in an electric furnace. A microscope photograph of its residue was taken in the state of dispersing in methanol and spreading on a slide glass, and the average value of the length of the filler was calculated by directly reading the filler length of 400 of fillers in the photograph.

After drying, the composition pellets obtained above were used in performing injection molding under the conditions of the resin temperatures, the mold temperatures and the like shown in Tables 1, 2 and 3 to obtain standard molded articles (standard test pieces) having dimensions described below in order to conduct the surface tape-peeling test and weld strength evaluation. The injection molding was conducted using a PS40E-5ASE type injection molding machine manufactured by Nissei Plastic Industrial Co., Ltd.

Test piece for the surface tape-peeling test:
Size 64×64×1 mm.
Test piece for weld strength evaluation:
Size 64×64×3 mm, pin diameter 6 mmφ.

<Surface Tape Peeling Test>

As to each of standard test pieces for the surface tape-peeling test, initial surface roughness value Ra1 (which is Ra value before the surface tape-peeling test) was measured using a surface profile analysis machine SAS-2010 manufactured by Meishin Koki Co., Ltd. The machine was configured with an optical non-contact type micro-tracer Focodyn and an operation system Perthometer C5D manufactured by Perthen GmbH.

Next, a series of operation was repeated 30 times in which a Cellotape (trade mark) CT-18 manufactured by Nichiban Co., Ltd. was stuck on and peeled off from a flat surface at which the initial surface roughness Ra1 was measured over the entire length of the test piece along the flowing direction of the standard test piece.

The surface roughness value Ra2 was measured on the flat surface of the standard test piece at which the operation of pasting and peeling the above-described tape was carried out in the same manner as described above, to obtain difference (μm) between Ra1 and Ra2 values, that is (Ra2−Ra1) value.

<Evaluation of Weld Strength>

As to each of standard test pieces for the weld strength evaluation, a test piece having a weld was cut out of the standard test piece for the weld strength evaluation, and a three-point bending strength was measured under the measurement conditions based upon ASTM D790 using TENSILON UTM-500 manufactured by A&D Co., Ltd.

<Molding of Tubular Molded Article for Electronic Part Case>

After drying, the composition pellets obtained above were used again in performing injection molding under the conditions shown in Tables 1, 2 and 3 to obtain tubular molded articles having an outer diameter of 25.60 mmφ, inner diameter of 20.00 mmφ and a length of 19.85 mm using PS40E-5ASE type injection molding machine manufactured by Nissei Plastic Industrial Co., Ltd.

As to the each obtained tubular molded article, the gate thorough which the composition was injected into the mold was cut out of the article, and the cutting part was sealed with a thermal caulking. Then, the surface of the article was cleaned by stirring gently for one minute in a pure water of 500 cc, and the stirring was stopped to maintain the article for 10 minutes. The number of the particles dispersed in the cleaning water was counted using the particle counter system in liquid manufactured by Rion Co., Ltd. The particles with a size of 2 μm to 100 μm in 10 ml of the sample cleaning water were counted. The measurement was performed five times per every sample, and the average amount of the particles in the 5-time measurement is regarded as the amount of particles generated from each article. When the generated amount of particles is smaller than 100 particles/ml, then frequency of particle generation from the article was evaluated to be small, which is represented by mark ○ in Tables 1, 2 and 3. When the generated amount of particles is 100 particles/ml or larger, then frequency of particle generation from the article was evaluated to be large, which is represented by mark x in Tables 1, 2 and 3.

TABLE 1

|  |  | Example 1 | Example 2 | Example 3 | Example 4 | Example 5 | Example 6 |
|---|---|---|---|---|---|---|---|
| Liquid Crystalline | LCP 1 | 60 | 70 | 60 | 0 | 80 | 60 |
| Polymer | LCP 2 | 0 | 0 | 0 | 60 | 0 | 0 |
| Fibrous Filler | mGF | 40 | 30 | 39 | 40 | 20 | 40 |
|  | cGF | 0 | 0 | 0 | 0 | 0 | 0 |
| Fiber Diameter (μm)* |  | 10 | 10 | 10 | 10 | 10 | 10 |
| Number-Average Fiber Length of Filler (μm) |  | 82 | 97 | 82 | 96 | 112 | 112 |
| Other Material |  |  |  |  |  |  |  |
| Titanium Dioxide |  | 0 | 0 | 1 | 0 | 0 | 0 |
| Talc |  | 0 | 0 | 0 | 0 | 0 | 0 |
| Polytetrafluoroethylene |  | 0 | 0 | 0 | 0 | 0 | 0 |
| BAW |  | 0 | 0 | 0 | 0 | 0 | 0 |
| Flow Starting Temperature (FT) (° C.) |  | 321 | 320 | 321 | 350 | 316 | 321 |
| Molding Temperature (° C.) |  | 360 | 360 | 360 | 380 | 360 | 360 |
| Injection Speed (mm/sec) |  | 200 | 200 | 200 | 200 | 200 | 100 |
| Mold Temperature (° C.) |  | 130 | 130 | 130 | 130 | 130 | 130 |
| Difference between R1 and R2 (μm) |  | 0.2 | 0.1 | 0.2 | 0.2 | 0.3 | 0.4 |
| Weld Strength (MPa) |  | 32 | 28 | 31 | 29 | — | 32 |
| Frequency of Particle Generation |  | ○ | ○ | ○ | ○ | ○ | ○ |

*The diameter is a fiber diameter shown in a brochure provided by the maker.

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
| Liquid Crystalline | LCP 1 | 60 | 60 | 65 | 60 | 70 | 60 |
| Polymer | LCP 2 | 0 | 0 | 0 | 0 | 0 | 0 |

TABLE 2-continued

|  |  | Comparative Example 1 | Comparative Example 2 | Comparative Example 3 | Comparative Example 4 | Comparative Example 5 | Comparative Example 6 |
|---|---|---|---|---|---|---|---|
| Fibrous Filler | mGF | 0 | 0 | 0 | 0 | 0 | 0 |
|  | cGF | 40 | 35 | 22 | 27 | 29 | 0 |
| Fiber Diameter (μm)* |  | 10 | 10 | 10 | 10 | 10 | — |
| Number-Average Fiber Length of Filler (μm) |  | 268 | 244 | 276 | 236 | 285 | — |
| Other Material |  |  |  |  |  |  |  |
| Titanium Dioxide |  | 0 | 0 | 0 | 0 | 0 | 0 |
| Talc |  | 0 | 0 | 13 | 13 | 0 | 0 |
| Polytetrafluoroethylene |  | 0 | 0 | 0 | 0 | 1 | 0 |
| BAW |  | 0 | 0 | 0 | 0 | 0 | 40 |
| Flow Starting Temperature (FT) (° C.) |  | 325 | 322 | 323 | 323 | 321 | 320 |
| Molding Temperature (° C.) |  | 360 | 360 | 360 | 360 | 360 | 360 |
| Injection Speed (mm/sec) |  | 200 | 200 | 200 | 200 | 200 | 200 |
| Mold Temperature (° C.) |  | 130 | 130 | 130 | 130 | 130 | 130 |
| Difference between R1 and R2 (μm) |  | 1.1 | 1.3 | 1.8 | 1.9 | 1.2 | 0.3 |
| Weld Strength (MPa) |  | 35 | 36 | 34 | 35 | 25 | 5 |
| Frequency of Particle Generation |  | x | x | x | x | x | x |

*The diameter is a fiber diameter shown in a brochure provided by the maker.

TABLE 3

|  |  | Comparative Example 7 | Comparative Example 8 | Comparative Example 9 | Comparative Example 10 | Comparative Example 11 |
|---|---|---|---|---|---|---|
| Liquid Crystalline Polymer | LCP 1 | 60 | 60 | 60 | 60 | 0 |
|  | LCP 2 | 0 | 0 | 0 | 0 | 60 |
| Fibrous Filler | mGF | 10 | 40 | 40 | 40 | 0 |
|  | cGF | 0 | 0 | 0 | 0 | 30 |
| Fiber Diameter (μm)* |  | 10 | 10 | 10 | 10 | 10 |
| Number-Average Fiber Length of Filler (μm) |  | 84 | 82 | 82 | 82 | 268 |
| Other Material |  |  |  |  |  |  |
| Titanium Dioxide |  | 0 | 0 | 0 | 0 | 0 |
| Talc |  | 30 | 0 | 0 | 0 | 0 |
| Polytetrafluoroethylene |  | 0 | 0 | 0 | 0 | 0 |
| BAW |  | 0 | 0 | 0 | 0 | 0 |
| Flow Starting Temperature (FT) (° C.) |  | 320 | 321 | 321 | 321 | 354 |
| Molding Temperature (° C.) |  | 360 | 360 | 340 | 340 | 385 |
| Injection Speed (mm/sec) |  | 200 | 200 | 200 | 200 | 200 |
| Mold Temperature (° C.) |  | 130 | 70 | 130 | 70 | 130 |
| Difference between R1 and R2 (μm) |  | 0.9 | 0.6 | 0.8 | 0.5 | 1.2 |
| Weld Strength (MPa) |  | 28 | 34 | 30 | 30 | 40 |
| Frequency of Particle Generation |  | x | x | x | x | x |

*The diameter is a fiber diameter shown in a brochure provided by the maker.

What is claimed is:

1. A resin molded article comprising a liquid crystalline polymer and a fibrous filler having a number-average fiber length of 30 to 200 μm, the article having a surface with difference of 0.4 μm or smaller in a surface roughness expressed by Ra value measured before and after repeating 30 times the operation of pasting and peeling a tape having an adhesive power of 4.0 N/mm.

2. The resin molded article according to claim 1 comprising 5 to 250 parts by weight of the fibrous filler on the basis of 100 parts by weight of the liquid crystalline polymer.

3. The resin molded article according to claim 1, wherein the liquid crystalline polymer comprises a liquid crystalline polymer selected from group (a), (b) and (c) below:

(a) polyester, polyesteramide and polyamide having a Structural Unit (I) below and/or a Structural Unit (II) below;

(b) polyester and polyesteramide having a Structural Unit (III) below, and a Structural Unit (IV) below and a structural unit selected from the Structural Units (I) and (II); and (c) polyester and polyesteramide having the Structural Unit (III); a structural unit selected from the Structural Units (D and (II); and a structural unit selected from the Structural Unit (IV), a Structural Unit (V) and a Structural Unit (VI),

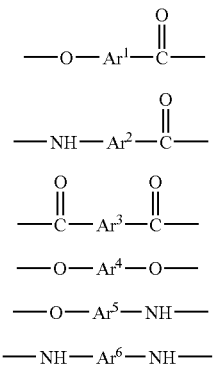

(I)
(II)
(III)
(IV)
(V)
(VI)

wherein $Ar^1$, $Ar^2$, $Ar^5$ and $Ar^6$ each independently represents a bivalent aromatic group; and $Ar^3$ and $Ar^4$ each independently represents a group selected from a bivalent aromatic group, a bivalent alicyclic group and a bivalent aliphatic group; and in $Ar^1$ to $Ar^6$, a part or all of hydrogen atoms on the aromatic ring in the aromatic groups may be substituted with a halogen atom, an alkyl group having 1 to 10 carbon atoms, an alkoxy group having 1 to 10 carbon atoms, or an aryl group having 6 to 10 carbon atoms, a part or all of hydrogen atoms in the alicyclic group may be substituted with an alkoxy group having 1 to 10 carbon atoms or an aryl group having 6 to 10 carbon atoms, and a part or all of hydrogen atoms in the aliphatic group may be substituted with an alkoxy group having 1 to 10 carbon atoms or an aryl group having 6 to 10 carbon atoms.

4. The resin molded article according to claim 3, wherein the liquid crystalline polymer comprises a liquid crystalline polymer selected from the group (a).

5. The resin molded article according to claim 3, wherein the liquid crystalline polymer comprises a liquid crystalline polymer selected from the group (b) in which the total amount of the bivalent aromatic group of the polymer is 60% by mole or more on the basis of the total amount of $Ar^1$, $Ar^2$, $Ar^3$ and $Ar^4$ of the polymer.

6. The resin molded article according to claim 3, wherein the liquid crystalline polymer comprises a liquid crystalline polymer selected from the group (c) in which the total amount of the bivalent aromatic group of the polymer is 60% by mole or more on the basis of the total amount of $Ar^1$, $Ar^2$, $Ar^3$, $Ar^4$, $Ar^5$ and $Ar^6$ of the polymer.

7. The resin molded article according to claim 1, wherein the liquid crystalline polymer is a liquid crystalline polyester having:
a structural unit derived from aromatic hydroxy carboxylic acid (I-1) and/or (I-2) below,
a structural unit derived from aromatic dicarboxylic acid selected from aromatic dicarboxylic acids (III-1), (III-2) and (III-3) below, and
a structural unit derived from aromatic diol selected from aromatic diols (IV-1), (IV-2), (IV-3) and (IV-4) below,

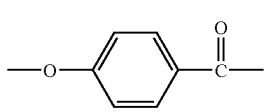

(I-1)

-continued

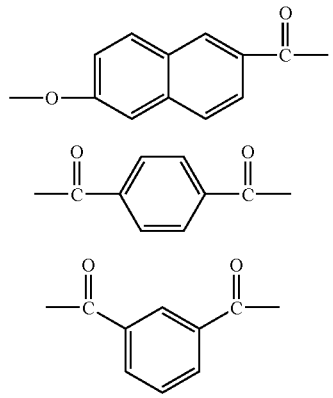

(I-2)

(III-1)

(III-2)

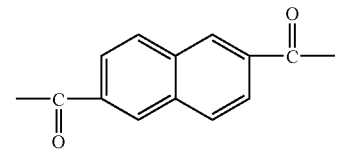

(III-3)

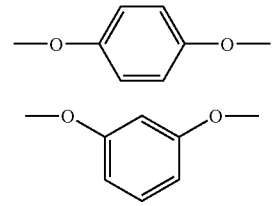

(IV-1)

(IV-2)

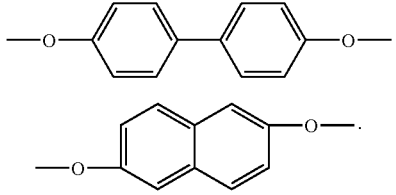

(IV-3)

(IV-4)

8. The resin molded article according to claim 1, wherein the fibrous filler is a fibrous filler which has not been treated with a coupling agent.

9. A method for producing the resin molded article of claim 1, the method comprising the step of molding a resin composition pellet which contains a liquid crystalline polymer and a fibrous filler having a fiber diameter of 5 to 15 μm and a number-average fiber length of 30 to 200 μm.

10. A method for producing the resin molded article of claim 1, the method comprising the steps of:
mixing and pelletizing a liquid crystalline polymer and a fibrous filler to obtain a resin composition pellet comprising the liquid crystalline polymer and the fibrous filler;
melting the resin composition pellet at a temperature of from a temperature higher than the flow starting temperature of the resin composition by 30° C. to a temperature higher than the flow starting temperature by 80° C. to obtain a melted resin composition; and
injecting the melted resin composition into a mold having a set temperature of 80° C. or higher to mold the composition so as to obtain a resin molded article.

11. A component for a camera module, the component comprising the resin molded article of claim 1.

* * * * *